United States Patent [19]
Estelle

[11] Patent Number: 4,743,103
[45] Date of Patent: May 10, 1988

[54] LENSES FOR PHOTOGRAPHIC PRINTERS

[75] Inventor: Lee R. Estelle, Rochester, N.Y.

[73] Assignee: Eastman Kodak Company, Rochester, N.Y.

[21] Appl. No.: 868,981

[22] Filed: May 29, 1986

[51] Int. Cl.⁴ .............................................. G02B 17/02
[52] U.S. Cl. ..................................... 350/445; 350/543
[58] Field of Search ................ 350/445, 6.4, 543, 540; 355/40

[56] References Cited

U.S. PATENT DOCUMENTS

| | | | |
|---|---|---|---|
| 1,947,668 | 2/1934 | Warmisham | 88/24 |
| 2,405,729 | 8/1946 | Altman | 88/57 |
| 2,937,569 | 5/1960 | Wilton | 353/81 |
| 3,338,654 | 8/1967 | Clapp | 350/202 |
| 3,554,776 | 11/1967 | Smitzer et al. | 353/81 |
| 3,649,119 | 3/1972 | Rempala et al. | 355/45 |
| 3,724,927 | 4/1973 | Cox | 350/445 |
| 3,770,347 | 11/1973 | Ambrose et al. | 355/43 |
| 3,981,574 | 9/1976 | Jesensky et al. | 353/101 |
| 4,080,056 | 3/1978 | Jesensky et al. | 355/5 |
| 4,275,639 | 6/1981 | Garber | 350/543 |
| 4,580,886 | 4/1986 | Hajnal | 350/540 |

FOREIGN PATENT DOCUMENTS

| | | | |
|---|---|---|---|
| 156124 | 10/1985 | European Pat. Off. | |
| 3248807 | 6/1983 | Fed. Rep. of Germany | |
| WO82/04485 | 6/1981 | PCT Int'l Appl. | 355/67 |

OTHER PUBLICATIONS

Optics and Laser Technology; vol. 4, No. 4; 8/1972.

*Primary Examiner*—John K. Corbin
*Assistant Examiner*—Rebecca D. Gass
*Attorney, Agent, or Firm*—John B. Turner

[57] ABSTRACT

A lens device for a photographic printer to enable it to print same size prints from full-frame and half-frame images intermixed in an elongate strip of spliced film strips. The lens device rotates the image through 90° without affecting the inversion needed in a printer lens. The device includes a pechan prism in each of the air spaces between the lens elements and the object and image planes, respectively. There is a relative angular displacement of 45° between the prisms.

5 Claims, 6 Drawing Sheets

LENSES FOR PHOTOGRAPHIC PRINTERS

BACKGROUND OF THE INVENTION

1. Field of the Invention

This invention relates to lenses for use in photographic printers.

2. Description Relative to the Prior Art

The processing and printing of photographic roll film includes an early step of splicing a plurality of similar film strips end-to-end. The spliced strips should be similar in size (e.g. 35 mm or 110 or 126) although not necessarily in length. Also, they should be similar in requiring the same developing process. Most of the characteristics, e.g., size and type are detectable prior to the strips being spliced end-to-end. One characteristic is not detectable unless the photographer has given appropriate information to the processing laboratory. This characteristic is size of frame of the latent images on the film. For example, with reference to FIGS. 6 & 7 of the accompanying drawings, the latent images on a 35 mm film might be full-frame images 30, i.e., 24 mm by 36 mm with the longer dimension parallel to the length of the strip 31, or they might be half-frame images 32, i.e. 24 mm×18 mm with the shorter dimension parallel to the length of the strip 33.

After the supposedly similar film strips 31, 33 have been spliced end-to-end, they are reeled up. The reel is placed at the beginning of a continuous processing apparatus in which the latent images are developed and fixed. The dried film is reeled up at the end of the apparatus and is transferred to a printer.

The continuous strip of film is led off its reel through the printer and prints are made at a rate of many thousands per hour. The direction of feed of the film strip through the printer is parallel to the direction of feed of a continuous web of sensitized paper through the printer. Thus, with full-frame 35 mm negatives with the lesser dimension of the negative image transverse to the film, the lesser dimension of the image 34 created on the web 35 of paper is transverse to the paper web. Thus, the width of the web 34 of paper is chosen to be equal to the desired lesser dimension of the finished print, see accompanying FIG. 8.

A problem arises when a strip of film which has half-frame images 32 is spliced in with film strips which have full-frame images 30. If no alternative provision was made, two images 36 and 36' would be printed on the paper web 35 from two adjacent half-frame images 32, as illustrated in FIG. 9. Each image 36 and 36' would be about half the size of the images 34 from full-frame negatives, i.e. about half the size the customer wants.

Endeavors to overcome the problem caused by the occasional presence of films with half-frame images have included a visual inspection of the spliced film strips after processing. When a strip with half-frame images is detected it is cut out of the continuous strip. The rejoined, continuous strip can then be printed without problem. The extracted film strips carrying half-frame images are then printed individually under human control. Such procedures are evidently time-consuming and costly.

German Offenlegungschrift 32 48 807 has proposed that a printer be provided with two interchangeable lenses one of which rotates the image through 90°. If the non-image-rotating lens is used to print full-frame images and the image-rotating lens is used to print half-frame images, the longer dimension of the images derived from both sizes of negative frame, can be oriented parallel to the length of the paper web. The image sizes can be made the same by appropriate selection of magnification of each lens. DE-A No. 32 48 807 describes an image-rotating lens which includes a plurality of elements with an air space in the middle which is located a dove prism. A known characteristic of a dove prism, used appropriately, is that it rotates an image by twice its own rotation. DE-A No. 32 48 807 recognizes a problem created by the use of the dove prism and it is related to the fact that the dove prism contains a single reflecting surface. The dove prism causes a reversion of the image produced by the lens including the dove prism when compared to the image produced by the lens without the dove prism (i.e., the full-frame lens). DE-A No. 32 48 807 states that this problem could be overcome by turning the film over when printing with the lens including the dove prism. This procedure would overcome the reversion problem but would obviously be inconvenient. Also, it would means that when the film is so turned over, the light would be directed first through the emulsion and then through the transparent film base, which is known to be undesirable. DE-A No. 32 48 807 discloses that in order to avoid the undesirable necessity to turn the film over when printing half-frame images with the lens including the dove prism, the other lens (for full-frame images) should also include a dove prism. This other dove prism, would be so oriented as to cause no rotation of the image but it would inherently produce reversion. Thus, both the lenses would cause reversion and one would rotate. This overcomes the necessity to turn the film over, but it requires that all portions of the film strip passed through the printer be in a 'turned over' condition, i.e, that the emulsion be on the side of the film base nearer the light source. Thus, the arrangement preferred in DE-A No. 32 48 807 has the disadvantage of operating in an undesirable manner. This problem may be restated as being that whereas a conventional printer lens causes inversion of the image, which allows the emulsion to be on the side of the base towards the paper, the preferred printer of DE A No. 32 48 807, with each of its two lenses including a dove prism, causes inversion and inversion and therefore requires that the emulsion be on the side of the base away from the paper.

SUMMARY OF THE INVENTION

It is an object of the present invention to overcome the problem of the prior art. The present invention achieves its object by providing a printer lens device which provides only the inversion normally associated with a printer lens as well as rotation.

BRIEF DESCRIPTION OF THE DRAWING

An embodiment of the present invention will now be described, by way of example, with reference to the accompanying drawings, in which.

DESCRIPTION OF THE PREFERRED EMBODIMENT

Figure 1:
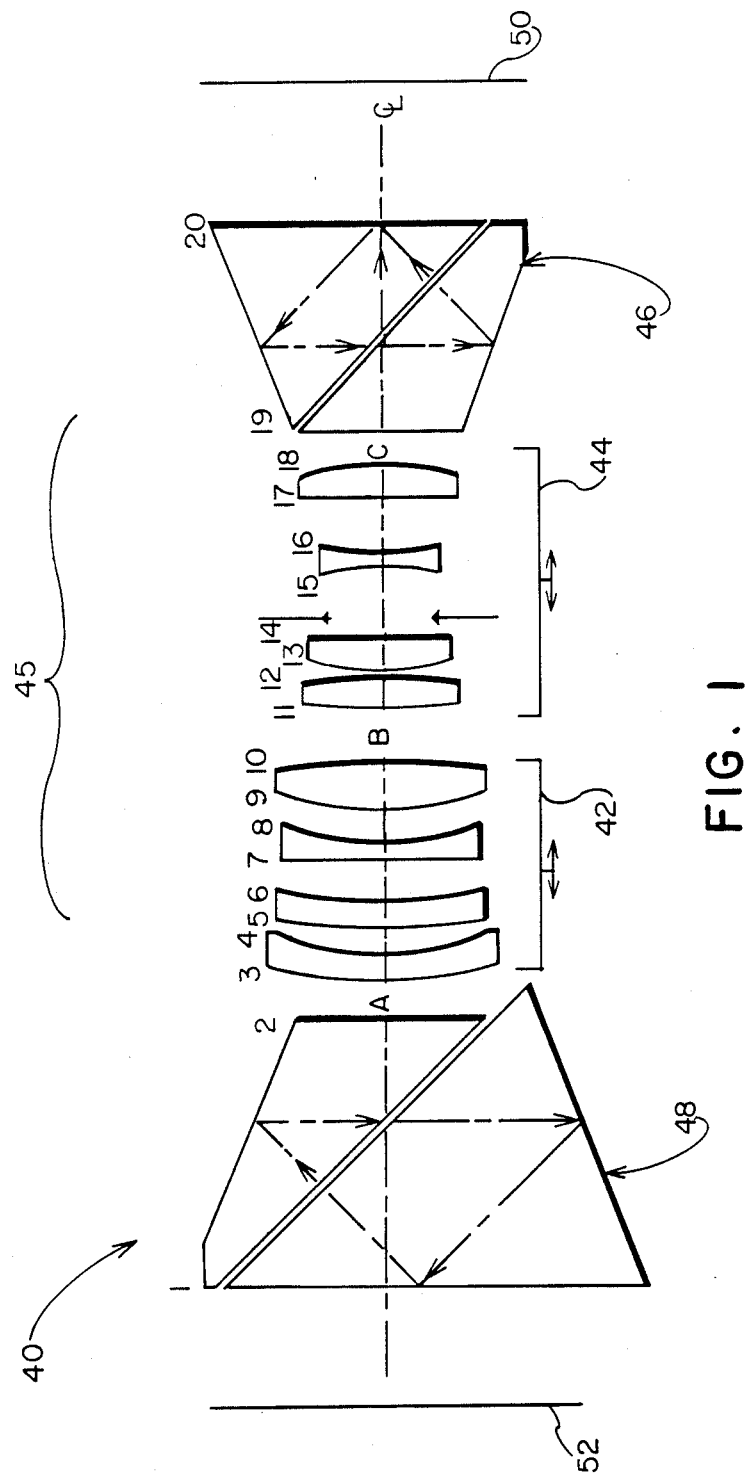
FIG. 1 diagrammatically represents the components of a zoom printer lens device for half-frame 35 mm negatives, embodying the present invention.
Figure 2:
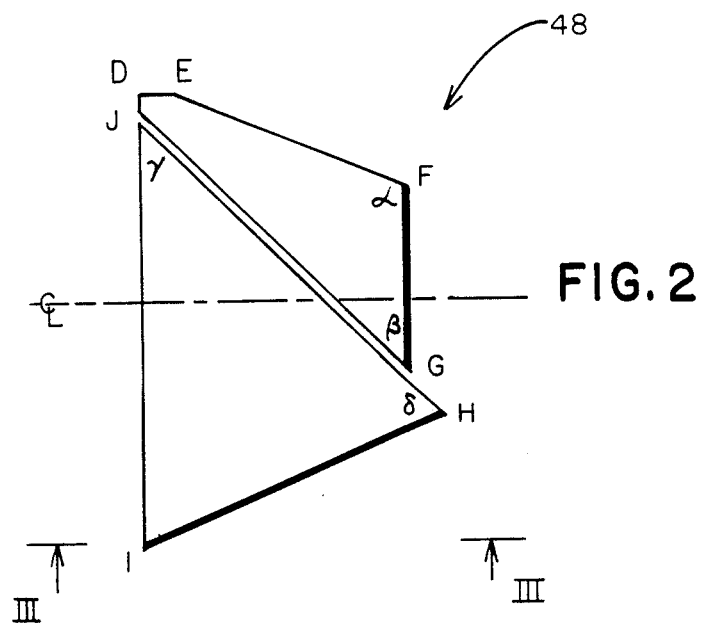
FIG. 2 represents a pechan prism included in the lens device represented in FIG. 1.
Figure 3:
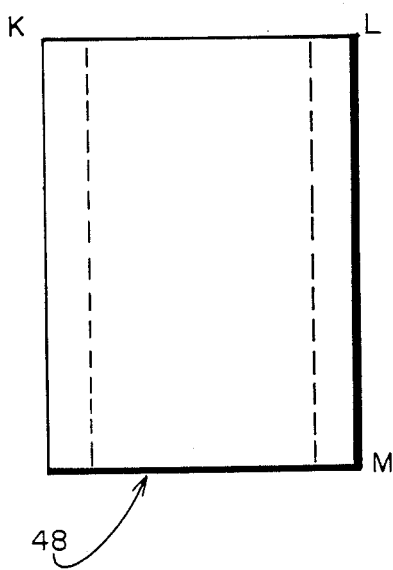
FIG. 3 is a view taken in the direction III—III in FIG. 2.
Figure 4:
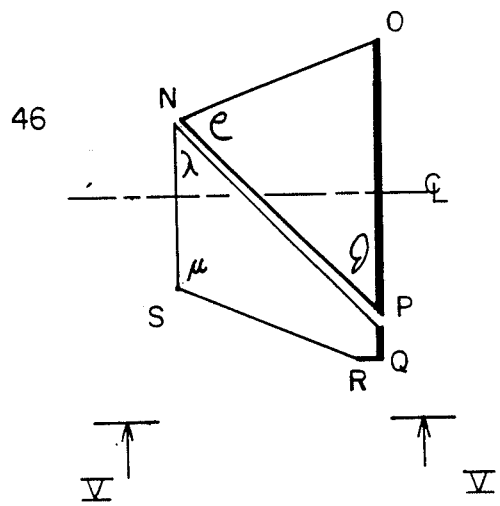
FIG. 4 represents another pechan prism included in the lens device represented in FIG. 1.
Figure 5:
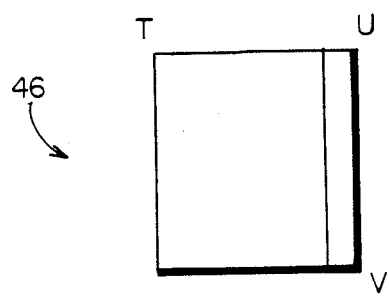
FIG. 5 is a view taken in the direction V—V in FIG. 4.
Figure 6:
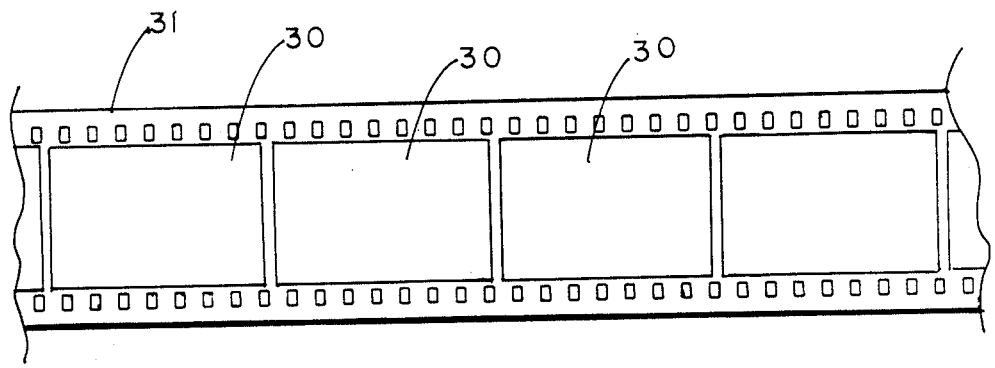
FIG. 6 represents a portion of a strip of 35 mm negatives with full-frame image format.
Figure 7:
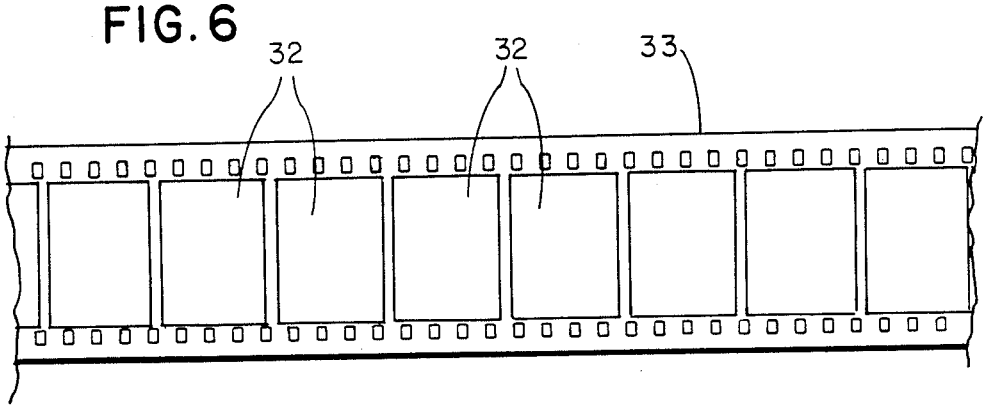
FIG. 7 represents a portion of a strip of 35 mm negatives with half-frame image format.

The lens device 40 represented in FIG. 1 is intended for photographically printing onto a sensitized web of paper successive images derived from a strip of 35 mm negative film carrying half-frame images, as is illustrated in FIG. 7. The web of paper on which the images are printed has a width equal to the desired lesser dimension of the finished prints. The lens device 40 includes two groups 42, 44 of lens elements which together constitute a zoom lens 45. The device also includes means for rotating the image relative to the object through a predetermined angle. The rotating means includes a first reflective device for rotating the image and a second reflective device for negating image reversion effected by the first reflective device. In the present embodiment, the first reflective device is a pechan prism 46 and the second reflective device is also a pechan prism 48. The prisms 46, 48 are located at opposite ends of the lens 45 in the air spaces between the lens 45 and the image plane 50 and the object plane 52, respectively.

The lens 45 produces an image which is inverted. Also, the lens is so designed as to have air spaces between its ends and the object and image planes 52, 50 sufficiently large as to accommodate the prisms 48, 46.

Figure 8:
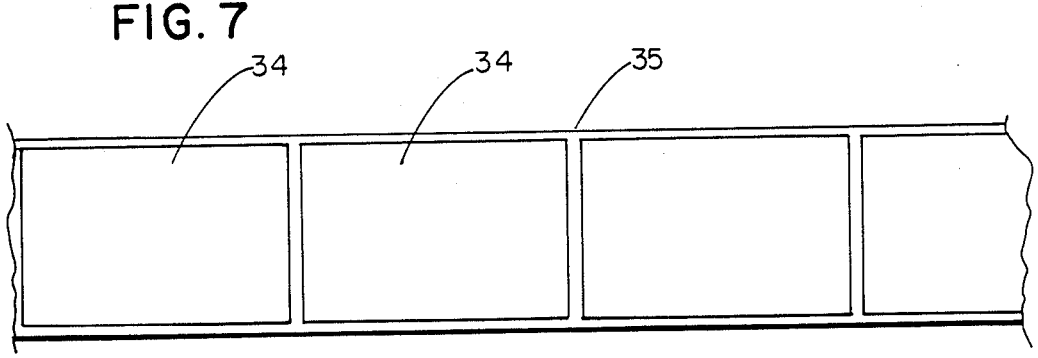
FIG. 8 represents a web of sensitized paper with the full-frame images of FIG. 6 printed thereon.
Figure 9:
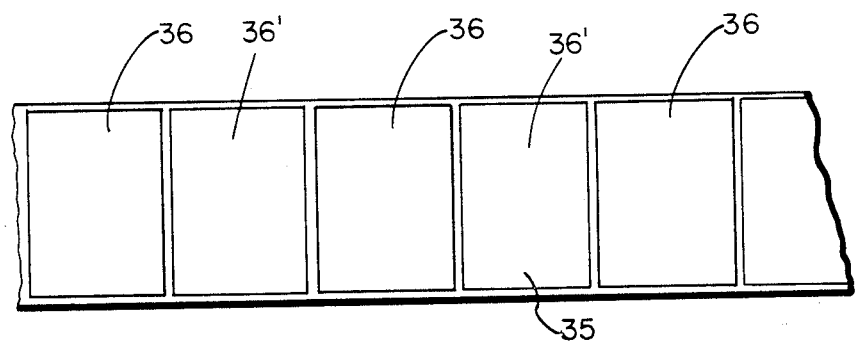
FIG. 9 represents a web of paper having the same width as that in FIG. 8 with the half-frame images of FIG. 7 printed thereon as with a lens similar to that which printed the image-bearing strip represented in FIG. 8.

With the relative orientations of the prisms 46, 48 illustrated in FIG. 1, which will be termed 0° of angular displacement of one relative to the other about the optical axis CL of the device, the image at plane 52 is inverted. The reversions caused by the two prisms 46, 48 cancel each other out in the illustrated orientation. However, for printing from half-frame negatives, there is a relative angular displacement of 45° of the prisms 46, 48 relative to one another, about the optical axis CL. The 45° 'rotation' causes a 90° rotation of the image. With the 90° rotation of the image, the longer dimension of the image 32 on the film strip 33 (i.e., the dimension transverse to the strip 33) (see FIG. 7) is rotated so that the longer dimension of the image 34 on the paper web 35 is parallel to the length of the web 35 (see FIG. 8). The actual orientation of the two prisms relative to the longitudinal directions of the film strip and the paper web is not important.

The two groups 42, 44 of lens elements are both moved for changing magnification, i.e., zooming, and the group 44 is moved relative to group 44 for adjusting focal length.

The following is data for the lens device (linear dimensions are in mm):

| SURFACE NO. | CLEAR APERTURE | RADIUS | THICKNESS | GLASS |
|---|---|---|---|---|
| 1 | 88.13 | PLANO | | |
| 2 | 42.13 | PLANO | A | |
| 3 | 37.58 | 91.2784 | 4.000 | 517–642 |
| 4 | 35.14 | 46.5678 | 4.946 | |
| 5 | 34.50 | 163.727 | 3.600 | 517–642 |
| 6 | 33.34 | 68.6332 | 7.360 | |
| 7 | 32.74 | PLANO | 3.300 | 744–448 |
| 8 | 32.38 | 59.7393 | 5.257 | |
| 9 | 34.16 | 57.1864 | 6.700 | 603–380 |
| 10 | 33.99 | −358.947 | B | |
| 11 | 24.81 | 149.498 | 5.000 | 683–445 |
| 12 | 24.23 | −149.498 | 1.000 | |
| 13 | 23.15 | 46.8943 | 5.000 | 689–495 |
| 14 | 21.60 | 478.139 | 3.559 | |
| | | DIAPHRAGM | 8.532 | |
| 15 | 18.38 | −66.1955 | 2.000 | 785–261 |
| 16 | 18.63 | 42.1077 | 12.136 | |
| 17 | 24.31 | PLANO | 5.500 | 691–547 |
| 18 | 25.32 | −39.1252 | C | |
| 19 | 25.44 | PLANO | | |
| 20 | 28.91 | PLANO | | |

In the table above the "Thickness" dimension is the dimension along the optical axis C between the surface of the line on which the dimension is given, and the surface listed next below. It may be an element thickness as on the line of surface 5 or an air gap thickness as on the line of surface 6.

A, B and C are variable thickness air gaps, the pechan prisms being mounted in a mount which constrains them against movement in the axial direction while the lens element groups 41, 44 are movable axially for focussing and zooming.

Data for the prisms are as follows:

| Prism 48 | |
|---|---|
| SIDE | LENGTH |
| DE | 6.27 |
| EF | 42.0 |
| FG | 32.0 |
| GJ | 63.69 |
| JD | 3.00 |
| HI | 56.295 |
| IJ | 73.553 |
| KL | 52.010 |
| LM | 74.0 |
| G to $G_L$ | 17.0 |
| J to $G_L$ | 28.0 |

There is an air gap of 0.05 mm between the two component prisms of the pechan prism 48.

| Angle | |
|---|---|
| α | 112.5° |
| β | 45° |
| γ | 45° |
| δ | 67.5° |

The faces extending from edge EF and from edge HI perpendicular to the plane of the paper of the drawings, are silvered.

| Prism 46 | |
|---|---|
| SIDE | LENGTH |
| NO | 37.164 |
| NP | 48.557 |

-continued

| Prism 46 | |
|---|---|
| | LENGTH |
| O to $G_L$ | 28.44 |
| PQ | 6.52 |
| QR | 4.38 |
| RS | 32.5 |
| SN | 28.44 |
| S to $G_L$ | 14.22 |
| UV | 37.00 |
| TU | 34.406 |
| Angle | |
| $\epsilon$ | 67.5° |
| $\theta$ | 45° |
| $\lambda$ | 45° |
| $\mu$ | 112.5° |

The faces extending from edges NO and RS, perpendicular to the plane of the paper of the drawings, are silvered.

The material of prism 46 is 734-517 and that of prism 48 is 755-276, and the respective refractive indices Ne are 1.73688 and 1.76167.

The focal length of the zoom lens is so set as to create an image, from a half-frame negative, the same size as the image from the other lens on the printer, which other lens is for full-frame objects.

While the above-described embodiment of the invention provides a zoom feature, this is not an essential part of the invention. As is known, a zoom lens provides a range of magnifications, which avoids the necessity to have a plurality of different fixed focal length lenses in order to print a like plurality of different sizes of prints. The invention could also be embodied in a lens device with a fixed focal length.

The embodiment of the invention specifically described above is intended to be one of two lens devices mounted for movement into and out of operative position, alternatively, on a photographic printer. The other lens device, when paired with the embodiment specifically described above, would be for printing full-frame 35 mm images. The other lens would, of course, be designed to operate with the same fixed conjugates as the above-described embodiment. The other lens would have less magnification because it would be creating the same size image from a larger object (the negative image on the film strip).

Figure 10:
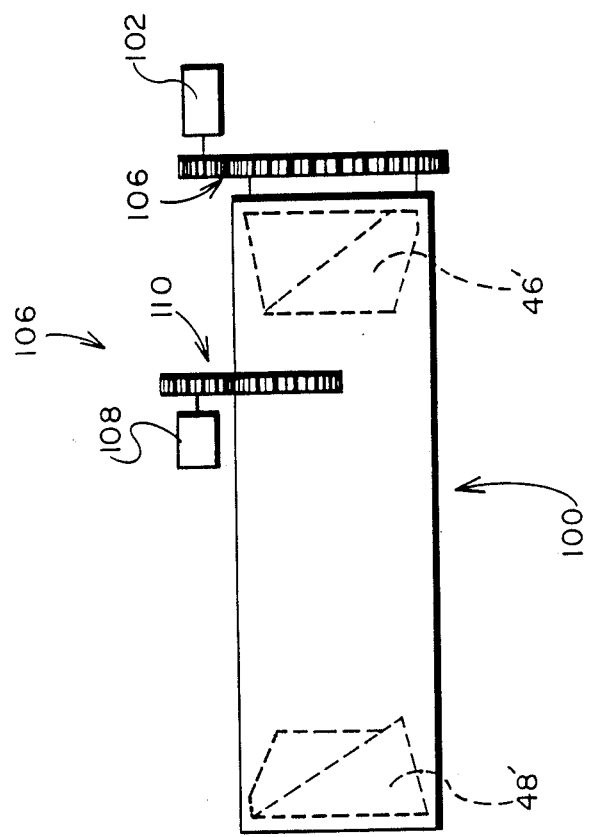
FIG. 10 is a diagrammatic representation of an alternative embodiment of the present invention.

An alternative embodiment of the present invention is diagrammatically represented in FIG. 10. The device 100 is generally similar to the device 40 and only differences will now be described. Features in the device 100 similar to those in device 40 will be given the same reference numerals but with the addition of a prime suffix (').

The device 100 is capable of being the only lens device in a printer and is capable of printing similar size images with similar orientations on a paper web from different size objects with different orientations on a film strip. In this embodiment the first reflective device, e.g. the pechan prism 46' is mounted for rotation relative to the remainder of the device and is drivable in rotation by drive means such as a stepping motor 102 and a gearing 104. Alternatively, a drive means could drive the prism 46' between preset stops.

The device 100 also has drive means 106 for driving the zoom lens to vary the focal length. The drive means 106 includes a motor 108 and gearing 110. The motor 108 may be a stepping motor or it may drive the zoom lens between preset stops.

When the lens device 100 is in a condition for printing full-frame 35 mm negatives there is no relative angular displacement of the prisms 46' and 48' and the drive means has driven the zoom lens to a particular focal length. When the printer determines that a strip of half-frame 35 mm is entering the printing gate, the motor 102 rotates the prism 46' through 45° and the drive means 106 drives the zoom lens so that its focal length is reduced so that the image again has the desired size.

While the lens device 100 has been said to be generally similar to the device 60, it should be understood that its formulae and dimensions will differ if the largest size negative to be used with it is greater than half-frame 35 mm, that being the object size for which the device 60 is designed.

The embodiment specifically described above with reference to FIG. 1 of the drawings is intended for use with half-frame 35 mm objects, i.e. objects smaller than the full-frame 35 mm objects to which the other lens is dedicated. It is to be understood that this is a matter of convenience because, at present, half-frame exposures are greatly outnumbered by full-frame exposures. If found convenient, the continuous strip of film could have a path through the printer at right angles to the path of the paper web. In such a case it would be the full-frame images which would be rotated. It should, however, be recognized that the reflective devices, e.g. the pechan prisms, would then be associated with the larger format and would have to be larger than if they were associated with the smaller format.

If a printer were to be so constructed and used that the larger dimension of a print was to be transverse to the paper web, then, for example, in the case of 35 mm film which might have full or half-frame, it would be the full frame which would be rotated by a lens device in accordance with the invention assuming that the film and paper web paths were parallel.

It will be observed that a lens device in accordance with the invention provides a printer designer the freedom of choosing the relative angular orientation of the film strip and paper web paths.

An advantage of a pechan prims over a dove prism is that, as used in DE-A No. 32 48 807, the dove prism produces far better results if the light incident on it is collimated. This is very limiting on the freedom of the lens designer and while the constraint can be accommodated in a fixed focus lens, such as that described in DE-A No. 32 48 807, the constraint would be substantially intolerable in the case of a variable focus lens. The pechan prism does not impose such a restraint.

What is claimed is:

1. A lens device capable of rotating the image relative to the object, including
    lens elements for creating an inverted image of the object, and
    means for rotating the image relative to the object through a predetermined angle, the rotating means including a first reflective device for rotating and reverts the image and a second reflective device for negating image reversion effected by the first reflective device, the first and second reflective devices being situated one in each of the air gaps between the lens elements and the object and image planes, respectively.

2. A lens device according to claim 1, wherein each of the first and second reflective devices is a pechan prism.

3. A lens device according to claim 1 or 2, wherein the first and second reflective devices have a relative orientation of 45° whereby the image is rotated 90° relative to the object.

4. A lens device according to claim 1 or 2, wherein the lens elements permit variation of the focal length of the device.

5. A lens device according to claim 1, wherein the means for rotating the image relative to the object is itself rotatable whereby the degree of rotation of the image relative to the object is variable and selectable.

* * * * *